United States Patent [19]

Sorenson et al.

[11] Patent Number: 5,747,546
[45] Date of Patent: May 5, 1998

[54] ION-EXCHANGE POLYMERS HAVING AN EXPANDED MICROSTRUCTURE

[75] Inventors: Marius W. Sorenson, Lake Jackson, Tex.; Robert A. Cipriano, Midland, Mich.; Jose J. Longoria; John D. Weaver, both of Lake Jackson, Tex.

[73] Assignee: The Dow Chemical Company, Midland, Mich.

[21] Appl. No.: 775,659

[22] Filed: Dec. 31, 1996

[51] Int. Cl.$^6$ .................... C08F 8/32; C08J 5/20
[52] U.S. Cl. .................. 521/32; 521/26; 521/27; 521/30; 521/38
[58] Field of Search ............... 521/32, 27, 30, 521/26, 38

[56] References Cited

U.S. PATENT DOCUMENTS

| | | |
|---|---|---|
| 3,884,885 | 5/1975 | Grot . |
| 4,000,057 | 12/1976 | Mrazek et al. ............ 204/296 |
| 4,246,091 | 1/1981 | Murayama et al. ........ 204/296 |
| 4,617,163 | 10/1986 | Smith .................... 264/235.6 |
| 4,791,081 | 12/1988 | Childress et al. ............ 502/62 |
| 4,798,674 | 1/1989 | Pasternak et al. ........... 210/640 |
| 4,877,529 | 10/1989 | Pasternak et al. .......... 210/500.37 |
| 4,952,318 | 8/1990 | Pasternak et al. ........... 210/638 |
| 5,006,576 | 4/1991 | Pasternak et al. ............. 521/27 |

FOREIGN PATENT DOCUMENTS

95/19222  7/1995  WIPO .

OTHER PUBLICATIONS

Cahan, B. D. et al., "AC Impedance Investigations of Proton Conduction in Nafion™", J. Electrochem. Soc., vol. 140, No. 12, pp. 185–186 (1993).

Primary Examiner—Fred Zitomer
Attorney, Agent, or Firm—Ann K. Galbraith

[57] ABSTRACT

Novel organic ion-exchange polymers and membranes formed from these polymers provide improved performance in electrolytic cells. The membranes exhibit an expanded micro-structure as the result of the removal of organic groups previously reacted with the ion-exchange groups of the polymer. The polymers are also useful in finely divided form as catalysts or deposited on a catalyst support. When formed into sheets, the polymers are useful as membranes in the separation of miscible liquids and in the separation of gases.

12 Claims, No Drawings

ION-EXCHANGE POLYMERS HAVING AN EXPANDED MICROSTRUCTURE

BACKGROUND OF THE INVENTION

This invention relates to ion-exchange polymers useful in electrolytic cell membranes, as catalysts, and in membranes for the separation of miscible liquids and for the separation of gases.

Fluorinated polymers with pendent chains containing anionic groups such as sulfonamide and sulfonic acid are well known in the art. These polymers are known to be useful as ion-exchange polymers for use in electrolytic cells where thermal and chemical stability are required, such as membranes for use in an electrolytic chlor-alkali cell. In this type of application, the cell membrane must provide as low electric resistance as possible during the electrolysis, yet have superior selective ionic permeability.

In U.S. Pat. No. 4,000,057, the conditioning of a membrane suitable for use in an electrolytic cell is described. The membrane is expanded by immersing the membrane in a liquid solvation system in which the membrane exhibits a substantially flat expansion curve verses time for at least the first four hours after immersion. Suitable expansion solution components are water, ethylene glycol, and glycerin. Maximum expansion of the membrane is disclosed as about 3 percent using a 25 percent solution of glycerin in basic brine. The reference discloses that conditioning of a membrane by exposure to boiling water provides a water uptake for the membrane of about 50 to 60 percent in an 800 equivalent weight perfluorinated sulfonic acid group ion-exchange membrane and 20 to 28 percent by weight water uptake in a perfluorinated sulfonic acid group ion-exchange membrane having 1000 equivalent weight.

In U.S. Pat. No. 3,884,885, a fluorinated polymer containing pendent, ion-exchange groups in the form of —$SO_3H$ or —$SO_2NH_2$ is disclosed as being converted to a melt-processable polymer by reaction with a tertiary amine, quaternary ammonium base, or the salt of the amine or base having a molecular weight below 500. Treatment of the polymer with the amine or quaternary ammonium base by exposing a film of the polymer to the amine or quaternary ammonium base dissolved in a solvent results in a polymer containing a tertiary amine group or quaternary ammonium group attached to a portion of the polymer. In this form, the polymer can be processed or fabricated utilizing the application of heat. Prior to treatment with the amine or quaternary ammonium base, the polymer is intractable. Displacement of the tertiary amine group or quaternary ammonium group forming a part of the polymer is taught by treatment with a strong base such as an alkali metal hydroxide, which results in the replacement of the tertiary amine or quaternary ammonium groups with an alkali metal ion.

The preparation of other fluorocarbon cation-exchange polymer membranes is disclosed in U.S. Pat. No. 4,246,091 by reaction of a cation-exchange membrane carrying as its ion-exchange radical a sulfonic acid radical with primary to tertiary monoamines or, alternatively, with quaternary ammonium salts. Improved ionic selectability is disclosed for the treated fluorocarbon ion-exchange polymer membranes. Treatment of the fluoropolymer ion-exchange polymer membrane is accomplished by dipping the membrane into an aqueous solution of a monoamine salt at a temperature between room temperature and the boiling point of the aqueous monoamine salt solution. Subsequent to this treatment, a heat treatment step is required to prevent the improved ionic selectivity from dissipating within a relatively short time after treatment. The heat-treating temperature is, generally, higher than 100° C. and is, preferably, higher than 140° C. The reference discloses that improved ionic selective performance is demonstrated by increased current efficiency in comparison with similar untreated membranes when the membranes are utilized in an electrolytic cell for the electrolysis of sodium chloride aqueous solutions.

In U.S. Pat. No. 4,617,163, membrane sheets of a cation-exchange perfluorinated polymer containing sulfonic acid groups in the sodium salt form are reacted with an aqueous solution of a salt of a primary, secondary, or tertiary amine or a quaternary ammonium salt in aqueous solution prior to stretching the membrane sheet so as to increase the surface area per unit weight of the membrane. This permits the membrane to be secured in a stretched state as a membrane in an electrolytic cell so that during operation of the electrolytic cell, the previously stretched membrane remains taut and unwrinkled. The anionic groups in the fluoropolymer ion-exchange membrane can be derived from sulfonic acid, a carboxylic acid, or phosphonic acid. The membrane can be stretched subsequent to reaction with the primary, secondary, or tertiary amine or a quaternary ammonium salt. Surface area increases resulting from stretching the membrane are disclosed as being at least 5 percent to at least 50 percent per unit weight of the membrane. Replacement of the organic group residues of the amine salt or quaternary ammonium salt can be effected by treatment with an alkali metal hydroxide.

The separation of organic liquids utilizing an ion-exchange membrane is disclosed by Pasternak et al. in U.S. Pat. Nos. 4,798,674; 4,877,529; 4,952,318; and in U.S. Pat. No. 5,006,576. These references disclose the use of perfluorinated ion-exchange membranes which have been contacted with a quaternary ammonium salt in which the preferred organic group is a lower alkyl.

In U.S. Pat. No. 4,791,081, heterogeneous active catalysts are disclosed which are prepared by coating a carrier substrate with an aqueous emulsion containing a fluorocarbon sulfonic acid polymer. The substrate has a pore size of at least about 0.1 micrometer and the polymer has pendent chains containing sulfonyl groups which are subsequently converted to sulfonic acid or sulfonamide groups. Improved catalytic efficiency of the polymer is obtained by supporting the polymer on a carrier.

The coating of the polymer on a carrier has been found to increase accessibility of the reactive acid groups in the polymer and, therefore, results in an improvement in the catalytic reactivity of the polymer. Porous alumina and silicon carbide carriers have been used for this application and the resulting catalysts exhibit greatly increased reactivity. However, the catalytic activity of such catalysts may be less than desirable for certain applications.

SUMMARY OF THE INVENTION

In one aspect, this invention is a cation-exchange fluoropolymer, prepared by a process comprising: (a) providing a cation-exchange fluoropolymer having an equivalent weight in the range of from 250 to 1000 and having counter-ions which are organic quaternary ammonium cations, and (b) exchanging at least 50 percent of such counter-ions with hydrogen ions or metal ions.

The polymers of the invention may be used to prepare more efficient ion-exchange membranes for use in catalysis, fuel cells, chlor-alkali cells, and more efficient membranes for separating miscible liquids and gases. The polymers of the invention are characterized by greater availability of the ion-exchange groups in the polymer. The polymers of the invention have a microstructure which, in the hydrated state, is more expanded than that of a polymer having hydrogen or metal ions which is prepared directly from the sulfonyl fluoride form of the polymer. A new polymeric morphology is provided in which the long chain hydrocarbon, fluorocarbon, or perfluorocarbon backbone of the ion-exchange polymer in the hydrated state becomes the discontinuous phase and water becomes the continuous phase. The pendent side chains bearing ion-exchange groups are oriented toward the continuous phase in the hydrated state.

It is believed, without intending to be bound, that the polymer morphology of polymers containing ion-exchange polymers having cations of residues of organic quaternary compounds (hereafter, "quaternary-containing salts") is relatively stable. When the cations in such polymer are subsequently exchanged with hydrogen or metal ions (ions which typically have a smaller size that that of the organic quaternary cations), the relatively stable morphology of the polymers results in a polymer microstructure having significantly different pore characteristics than a polymer microstructure of the same ion-exchange polymer which was not prepared utilizing the process described above. The pore characteristics of the ion-exchange polymers of the invention have enhanced ability to uptake water or other polar fluids used to expand the polymer.

Typically, in expanded microstructures of ion-exchange polymers having equivalent weights of at least 800 prepared by previously-known processes, the polymers form a continuous phase having cylindrical channels formed by ionic clusters through which water or other fluids used to expand the polymer may pass. By contrast, in the polymer of the invention, small angle X-ray scattering analyses indicate that fluid content of the expanded polymer is so high that the fluid may form the continuous phase. This expanded microstructure provides improved fluid absorption and a reduction in specific gravity.

By appropriate selection of the alkyl, aryl, aralkyl, or cycloalkyl groups present in the quaternary ammonium, phosphonium, or arsonium compound utilized to react with the starting ion-exchange polymer, polymers having improved catalytic activity, and membranes showing improved performance in electrolytic cells and fuel cells, as well as improved membranes useful in the separation of miscible liquids and gases, can be achieved. Specifically, there may be obtained an expanded polymer having a weight of about 125 percent to about 275 percent of the dry weight of the polymer, a specific gravity of about 80 percent to about 90 percent of the specific gravity of a polymer of the same ion-exchange polymer which has not been derived from a quaternary-containing salt, and an electrical resistivity of about 2 to about 4 times greater than the electrical resistivity of a polymer of the same ion-exchange polymer which has not been derived from a quaternary-containing salt.

When the polymer of the present invention is utilized as a membrane in a chlor-alkali cell, the increased fluid uptake of the membrane results in the membrane having a relatively low resistivity, thereby improving the performance of the membrane. When the polymer of the invention is utilized as a catalyst in an acid-catalyzed reaction, the relatively large microstructure of the polymer results in greater accessibility of the acid groups within the polymer, thereby resulting in an improved catalytic effect. These and other advantages of the invention will be apparent from the description which follows.

DESCRIPTION OF THE INVENTION

The term "expanded" as used herein refers to a polymer microstructure comprised of ion-exchange polymers, which exhibits at least a 75 percent by volume water uptake when placed in boiling water for one hour, relative to the dry form of the polymer. However, the polymers described herein are also useful in applications wherein the use of a different polar fluid may be more desirable.

The term "ion exchange polymer" as used herein refers to an organic polymer containing carbon atoms in a backbone polymer chain and bearing pendent side chains having ion-exchange groups, but preferably having anionic groups present in the acid or salt form. The morphology of the polymers may be observed using small angle X-ray scattering analysis.

The polymer provided in step (a) of the process of the invention may be prepared by any suitable process. An example of such is to react an expanded fluoropolymer having pendant sulfonic acid groups (in its acid or metal salt from) and an equivalent weight of about 800 with, for example, a quaternary alkyl ammonium hydroxide having a molecular weight of 350 or greater. If necessary, the polymers are then processed into the desired form of a polymer. In step (b) of the process, the quaternary onium cations are removed from the polymer and replaced with metal or hydrogen cations.

In accordance with one embodiment of the invention, there is provided an ion-exchange polymer having a plurality of fixed anionic groups, which has been derived from a polymer of the corresponding quaternary salts. Such salts may be prepared by first reacting an ion-exchange polymer with an organic quaternary compound reactant having a positive formal charge such as, for instance, a quaternary ammonium, phosphonium, or arsonium base or salt thereof. The quaternary compound preferably has a molecular weight of at least 250, more preferably at least 300, more preferably at least 350, and most preferably at least 500. Examples of such include quaternary ammonium hydroxide, phosphonium hydroxide, arsonium hydroxide, as well as their corresponding salts.

The ion-exchange polymer has carbon atoms in a polymer backbone chain and pendent side chains having anionic groups. The pendent side chain anionic groups can have ion-exchange groups derived from at least one acid selected from the group consisting of sulfonic acid, carboxylic acid, and phosphonic acid. Preferably, the ion-exchange polymer is a fluorinated and, most preferably, is perfluorinated polymer. The ion-exchange polymer is preferably a fluoropolymer, but is most preferably, a perfluoropolymer-containing acidic groups such as those derived from sulfonic acid, carboxylic acid, phosphonic acid, or derivatives thereof. The ion-exchange polymer is preferably a fluorinated or perfluorinated sulfonic acid polymer having an equivalent weight of about 600 to about 1500, preferably, about 800 to about 1200.

To prepare the quaternary-containing salt, an organic quaternary compound is contacted with an ion-exchange polymer under conditions sufficient to replace the counter-ion of the polymer with an ion derived from the compound. In step (b) of the process described above, the same ion is removed and replaced with hydrogen or metal ions. Subsequent to the reaction at ambient or elevated temperature and regeneration as described above, the ion-exchange polymer has undergone a physical change in its microstructure. Upon exposing the polymer to water, the polymer backbone is no longer the continuous phase, the water, instead, becoming the continuous phase.

The fixed anionic groups in the ion-exchange polymer may, for example, be derived from a sulfonic acid, a carboxylic acid, or phosphonic acid and the groups suitably are present in the ion-exchange polymer in such a proportion that the ion-exchange capacity of the membrane is in the range of about 0.2 to about 2.0 meq/g of dry membrane. Preferably, the ion-exchange groups are derived from a sulfonic acid.

The ion-exchange polymer may, for example, contain perfluorinated groups represented by the formulas:

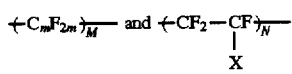

where m has a value of 2 to 10 and is, preferably 2; M and N are positive integers and the ratio of M to N is, preferably, such as to give an equivalent weight of the groups X in the range 600 to 1500, that is, to give a gram equivalent of X per 500 to 1500 grams of polymer; and X is chosen from:

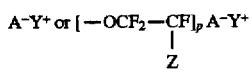

where p has a value of, for example, 1 to 3; Z is fluorine or a perfluoroalkyl group having from 1 to 10 carbon atoms; A is a fixed anionic group, for instance, $-COO^-$ or $-SO_3^-$; and $Y^+$ is a cation containing an organic group or a plurality of organic groups.

Preferably, the cation-exchange polymer contains pendant groups of the formula:

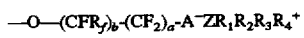

wherein a and b are independently a number from 0–2 and $a+b \geq 1$; A is $-COO^-$ or $-SO_3^-$; $R_f$ is F, Cl, a perfluoroalkyl group having 1 to 10 carbon atoms, or a fluorochloroalkyl group having 1 to 10 carbon atoms; Z is P, Ar, or N; $R_1$, $R_2$, $R_3$ and $R_4$ are independently $C_{1-30}$ alkyl, aryl, aralkyl or cycloalkyl; and the cation has a molecular weight of at least 300, and most preferably contains pendant groups of the formula:

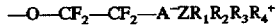

wherein A is $-COO^-$ or $-SO_3^-$; Z is P, Ar, or N; $R_1$, $R_2$, $R_3$ and $R_4$ are independently $C_{1-30}$ alkyl, aryl, aralkyl or cycloalkyl; and the cation has a molecular weight of at least 300.

The cation of the quaternary-containing salt is preferably a quaternary ammonium cation. Ion-exchange polymers reacted with quaternary ammonium organic 20 cations provide the desired microstructural changes in the ion-exchange polymer when these organic cations are subsequently removed and replaced with hydrogen or metal ions to produce the polymers of the invention.

The organic groups of the quaternary ammonium compound which is used to prepare the polymer provided in step (a) can be alkyl, aryl, aralkyl, or cycloalkyl groups. The alkyl groups can contain from 1 to 18 carbon atoms, the aromatic groups can contain from 6 to 18 carbon atoms, and the aralkyl or cycloalkyl groups can contain from 7 to 19 carbon atoms. Generally, the ion-exchange polymer used to prepared the quaternary-containing salt is reacted with any quaternary compound having a positive formal charge and a molecular weight of about 250 or greater, preferably, about 300 or greater and, most preferably, about 350 to about 500. Most preferably, the starting organic ion-exchange polymer is reacted with a quaternary ammonium cation derived from a quaternary ammonium base or salt thereof having a molecular weight of about 350 to about 500 and the formula:

wherein $R_1$, $R_2$, $R_3$, and $R_4$ are independently in each occurrence an alkyl, aryl, cycloalkyl, aralkyl, or a halogen derivative of an alkyl, aryl, cycloalkyl, or aralkyl group, and the cationic group has a total molecular weight of about 250 or greater, preferably, about 300 or greater and, most preferably, about 350 to about 500. $R_1$, $R_2$, $R_3$, and $R_4$ are preferably selected from alkyl, or a halogenated alkyl, halogenated aryl, halogenated aralkyl. X is fluorine, chlorine, bromine, iodine, hydroxyl, nitrate, a carboxylic acid radical, or an inorganic acid radical. Such compounds have a formal positive charge on the cation, $NR_1R_2R_3R_4^+$, in comparison with a tertiary amine which has no formal charge. This distinction is believed important since this may explain the fact that tertiary amines having similar molecular weight organic groups are not useful reactants with ion-exchange polymers to produce the polymers of the invention.

The polymer of the invention is prepared in one embodiment using at least two essential process steps: (1) reaction of a starting organic, anionic, ion-exchange polymer in the acid or salt form (which is also preferably in a finely-divided state) with a quaternary ammonium compound having organic groups such that nitrogen containing cations are attached to all or substantially all fixed anionic groups in the starting ion-exchange polymer, and (2) removal of all or substantially all of the nitrogen-containing cations containing an organic group, as described above, so that all or substantially all of the original fixed anionic ion-exchange groups in the ion-exchange polymer are converted back to the acid or salt form. Prior to process step (2) above, the polymer can be processed, including thermal processing, to provide a film or membrane of a desired thickness as a sheet or coating.

Removal of all or substantially all of the cations containing organic groups which are attached to the fixed anionic ion-exchange groups of the starting ion-exchange polymer can be accomplished, where the ion-exchange polymer is, for instance, in the form of a membrane suitable for use as an ion-exchange membrane in an electrolytic cell, either before or after the membrane has been placed in its position in the cell. Treatment of the membrane to remove the cationic groups derived from the quaternary ammonium base or salt thereof described above can comprise exposing the membrane to a solution of an alkali metal or alkaline earth metal hydroxide. Replacement of cations containing organic groups by alkaline earth metal or alkali metal ions is readily effected where the cations are quaternary alkyl ammonium groups. Removal of other organic groups can be effected by one or a succession of treatments with an aqueous solution comprising an alkali metal hydroxide. Cations containing aromatic or cycloaliphatic groups are more difficult to remove only through contact with a single solution of an alkali metal hydroxide. Removal of all or substantially all of such cations and replacement with hydrogen ions may also require successive treatments with acidified acetonitrile or a solution of hydrogen peroxide instead of, or in addition to, treatment with an alkali metal hydroxide at elevated temperature.

A representative reaction of a perfluorosulfonic acid ion-exchange polymer with a quaternary ammonium base or salt thereof is initiated by freezing a perfluorosulfonic acid polymer in liquid nitrogen and then grinding the polymer to a finely divided state. The powdered polymer can be mixed with a dispersant such as Freon™ 113 (available from DuPont) during grinding in an attritor to yield a slurry of an ion-exchange perfluorosulfonic acid polymer. Thereafter, the Freon™ is evaporated utilizing a nitrogen sweep. After drying, the powdered polymer is mixed with deionized water and methanol until all of the solid polymers have been wet out and a dispersion formed. Thereafter, a quaternary alkyl ammonium chloride (available as Bardac™ 2250 from Lonza), which is dimethyldidecylammonium chloride, is mixed with deionized water and added to the dispersion of the ion-exchange perfluorosulfonic acid polymer. The mixture can be allowed to react for about 30 minutes to 4 hours prior to recovering the particulates by filtration. The reaction product obtained containing a quaternary alkyl ammonium cation is rinsed with deionized water until all the chloride ion is removed.

Prior to removal of the nitrogen-containing cation from the ion-exchange polymer, the polymer, which is now thermoplastic, can be formed into a membrane suitable for use in an electrolytic cell by the application of heat and pressure in order to mold the thermoplastic polymer. Prior to reaction with the quaternary alkyl ammonium chloride, the starting ion-exchange fluorosulfonic acid polymer cannot be characterized as thermoplastic. Subsequent to the removal of the nitrogen-containing cation from the starting ion-exchange polymer, the novel ion-exchange polymer of the invention is converted back to the non-thermoplastic form. In addition to ion-exchange polymers containing sulfonic acid ion-exchange groups or metal salts thereof, the ion-exchange polymer used to prepare the ion-exchange polymer having a quaternary onium cation, may contain, for instance, carboxylic acid groups or phosphonic acid groups in the form of the free acid or metal salts thereof.

Reaction of the ion-exchange polymer containing fixed anionic groups with the quaternary ammonium base or salt thereof, can be effected at ambient or elevated temperature by contacting the ion-exchange polymer with a mixed organic solvent and aqueous solution of the salt of the quaternary ammonium compound. In order to accelerate the reaction between the fixed anionic groups of the ion-exchange polymer and the mixed organic solvent and aqueous solution of the quaternary ammonium salt, the reaction can be conducted at elevated temperature, for instance, a temperature between about 30° C. to about 100° C. The reaction time used to insert the nitrogen-containing cation to replace the fixed anionic groups of the ion-exchange polymer will depend upon the specific nitrogen-containing compound utilized and on the nature of the fixed anionic groups in the ion-exchange polymer. Suitable reaction times can be chosen by one skilled in this art by means of simple experiments.

The polymer of the invention exhibits a microstructural form which is morphologically different from the physical form of an ion-exchange polymer having the same chemical formula, but which has not been derived from a quaternary-containing salt. The microstructure of the fluoropolymers of the invention does not depend upon the use of a particular liquid medium to swell and expand the microstructure of the polymer. When the polymer of the invention is in the form of a membrane, such membranes are characterized by increased conductivity and decreased resistivity when utilized in an electrolytic cell which is in contact with an electrolyte. This characteristic makes the use of such membranes particularly desirable for certain applications because of their greater current efficiency. An example of such an application is an electrolytic cell for the production of chlor-alkali. Because the reaction of the preferred quaternary ammonium bases or salts thereof with the fixed anionic groups of an ion-exchange polymer allows the introduction of organic cationic groups of varying size into the physical structure of the polymer, the microstructure and fluid uptake properties of the polymer may be tailored for a particular application.

The inventive process for the preparation of the polymer of the invention provides a new way of controlling the nature (for example, the hydrophilicity) as well as the size of the coordination sphere around the ion-exchange groups present in the fluoropolymers therein. In this way, the degree of proximity and thus the ease of communication from functional ion-exchange group to functional ion-exchange group can be controlled. The pore size of the novel ion-exchange polymer membrane can be altered simply by changing the size of the cation containing an organic group which is reacted with the fixed anionic groups of the starting, ion-exchange polymer. In addition, the temperature at which such polymers flow under the influence of heat is dependent upon the size and nature of the cation containing an organic group which is reacted with the fixed anionic groups of the ion-exchange polymer.

By proper selection of various quaternary ammonium bases or salts thereof for reaction with the starting, organic, ion-exchange polymer, it is possible to prepare polymers that contain specific size pores which are also useful, when formed into membranes, in the separation of miscible liquids such as is required in chlor-alkali, organic electrochemistry, battery technology, fuel cell technology, gas separation processes, catalysts for organic reactions, shape selective catalysis, etc. Accordingly, ion-exchange membranes prepared from the novel ion-exchange polymers of the invention offer the advantages resulting from the ability to custom tailor an ion-exchange polymer membrane to a particular application by altering the pore size by selection of a reactant having a suitable size organic cation.

Unexpectedly, the ion-exchange polymers of the invention when made into ion-exchange membranes exhibit increased film toughness and the ability of the membrane to resist tearing. This property is particularly important in applications which require large surface area electrolytic cell membranes such as in chlor-alkali electrolytic processes and in fuel cells, as well as in gas separation processes. These properties are retained after the organic group in the cation derived from the quaternary ammonium base or salt thereof is removed and replaced by an alkali metal ion or after the salt is converted back to the acid form. Thus, a permanent change in the morphology of the polymer matrix has occurred. This change in physical structure is not related to prior art methods of improving the performance of an ion-exchange membrane by subjecting the membrane to boiling water or other swelling solution such as have been disclosed in U.S. Pat. No. 4,000,057, discussed above. Accordingly, a permanent microstructural change occurs as a result of the process of forming the polymer of the invention.

In one embodiment of the instant invention, the polymer of the invention is used as an acid catalyst in an acid-catalyzed organic chemical reaction. In a preferred embodiment of such a process, the polymer is affixed onto a suitable support medium. Preferably, an aqueous emulsion of the polymer in its sulfonyl fluoride form is used to coat the support, before the polymer is converted to a form containing organic quaternary ammonium cations. Subsequent to this reaction, the coated-catalyst carrier is dried and heated and the quaternary salt form of the catalyst is converted back to the acid form by successive treatments with acidified acetonitrile. As an alternative method, the polymer and support may be co-precipitated from an emulsion, as illustrated in PCT Publication WO95/19222. Examples of organic reactions in which such a catalyst may be useful include alkylation of aromatic compounds with olefins or alkyl halides, esterification of carboxylic acids, nitration of aromatic compounds, acylation of aromatic compounds, hydrolysis of ethers, and polymerization of olefins.

Suitable inert catalyst support media may be selected from alumina, silica, zeolites, silicon carbide, silica-alumina, porous glass, ceramic, spinel, clay, or carbon. While the composition of the inert catalyst carrier support is not critical to the catalytic properties of the catalyst, properties that can be important in some situations include high crush strength, high porosity, chemical resistance, thermal stability, and low cost.

The preferred amount of fluoropolymer in relation to the catalyst support is between 0.1 to about 50 weight percent, preferably up to about 25 weight percent. The optimum amount of polymer on the support is dependent upon a number of variables including the specific gravity of the support, the pore size, and the properties of the reaction medium. In general, the activity of the catalyst in a particular reaction will increase as the amount of fluoropolymer catalyst increases up to an optimum amount. Because of the greater accessibility of the functional groups of the fluoropolymer catalyst of one embodiment of the invention in comparison with those fluoropolymer catalysts of the prior art, it is possible to increase the rate and amount of conversion of a specific reaction by utilizing an increased amount of the fluoropolymer catalyst of the invention which is an amount in excess of an optimum amount of fluoropolymer catalyst of the prior art.

In accordance with the invention, polymers are disclosed which are useful, for example, as membranes in electrolytic cells, as catalysts, and as membranes in the separation of miscible liquids and gases. Ion-exchange membranes prepared from polymer of the invention can be used in a corrosive atmosphere, such as in a chlor-alkali electrolytic cell.

When the polymer of the invention is in the form of an ion-exchange membrane, such membrane is preferably in the form of a sheet or coating having a thickness in the range of about 0.01 to about 2 mm. Such membranes possess an electrical resistivity which is relatively lower than that of the prior art ion-exchange membranes as a consequence of the increased uptake of fluid which characterizes the membranes.

In the following examples, there are illustrated the various aspects of the invention but these examples are not intended to limit the scope of the invention. Where not otherwise specified in this specification and claims, temperature is in degrees centigrade and parts, percentages, and proportions are by weight.

EXAMPLE 1

Preparation of Perfluorosulfonic Acid Polymers Having Quaternary Ammonium Cations A perfluorosulfonic acid polymer having an equivalent weight of 804 is converted to the acid form and ground to a powder by freezing pellets of polymer in liquid nitrogen followed by grinding. The polymer powder is sieved through a 60 mesh screen and mixed with 200 milliliters of Freon™ 113 and pored into an attritor for further grinding. The powder is ground for a total of three hours after which the slurry is collected and the Freon removed using a nitrogen sweep. After drying, 6 grams (0.007 mols) of the powder is mixed with a solution of 50 milliliters of methanol and 150 milliliters of deionized water and stirred until all the solids are wet. This dispersion is then mixed with 5.74 grams of a 50 weight percent solution of a mixture of quaternary ammonium bases (2.87 grams of base (0.007 mols)), containing 10 percent isopropyl alcohol and 40 percent water as solvent (available as Barquat™ 1552 from Lonza). The bases contained in Barquat™ 1552 are a mixture of the chloride salts of quaternary ammonium bases containing about 42 percent n-alkyl (60 percent 14 carbon atoms, 30 percent 16 carbon atoms, 5 percent 12 carbon atoms, and 5 percent 18 carbon atoms) and 8 percent di-n-alkyl (60 percent 14 carbon atoms, 30 percent 16 carbon atoms, 5 percent 12 carbon atoms, and 5 percent 18 carbon atoms). The bases have an average equivalent weight of 410. After the Barquat™ 1552 solution is added to the polymer dispersion, the reaction between the polymer and the bases is allowed to continue for 30 minutes at ambient temperature before recovering the polymer as a powder on filter paper and rinsing with water to remove hydrochloric acid produced in the reaction. Using the recovered powder as a starting material, this process is repeated three times, and the polymer obtained thereby is dried in a vacuum oven for a total of three hours at 120° C.

EXAMPLE 2

Preparation of Perfluorosulfonic Acid Polymer Having Quaternary Ammonium Cations A perfluorosulfonic acid polymer in the amount of 29.75 grams (0.037 mols) having an equivalent weight of 804, is weighed into a beaker and mixed with 26.714 grams of Bardac™ 2250 (0.037 mols). Bardac™ 2250 is a 50 percent solids solution of dimethyldidecylammonium chloride, which has an equivalent weight of 36. The mixture is diluted with about 200 milliliters of deionized water and the reaction between the perfluorosulfonic acid polymer and the base is allowed to proceed at ambient temperatures with stirring over a period of ½ hour. The mixture is filtered and the liquid portion decanted off and replaced by a second solution having the same amounts of Bardac™ 2250 and deionized water, and is allowed to react with the perfluorosulfonic acid polymer for two hours. Thereafter, the liquid portion is decanted off after filtering out the solids, a third solution using the same weights of Bardac™ 2250 and deionized water is added. The mixture is stirred overnight before filtering and rinsing with deionized water. The rinse is performed in order to remove any unreacted Bardac™ 2250 and to remove hydrochloric acid which is formed as a by-product of the reaction. This procedure provides a polymer having a quaternary ammonium base residue of 28.9 percent by weight and 51.4 percent by volume.

Preparation of Membrane

A sample of the polymer obtained is pressed at a temperature of 175° C. after preheating the polymer for 1½ minutes at this temperature.

Removal of Quaternary Ammonium Cations

The membrane prepared above is soaked for two weeks in a solution of hydrogen peroxide to remove any residue of the Bardac™ 2250, with the hydrogen peroxide solution changed daily. Thereafter, the membrane is placed in a solution of methanol and sodium hydroxide containing 5 percent by weight NaOH, 90 percent by weight methanol and 5 percent by weight water. This procedure converts the polymer to the sodium salt form of the ion-exchange polymer. The water absorption properties of the membrane are shown in Table 2.

EXAMPLE 3

Preparation of Supported Acid Catalyst

A silicon carbide catalyst carrier (⅛" diameter hollow cylinders), which has a median pore diameter of 80 micrometers and surface area of 0.03 m²/g, is placed in a round-bottomed flask. To it is added an aqueous emulsion of a fluorocarbonsulfonic acid polymer having an equivalent weight of about 800 which is in the sulfonyl fluoride form. The volume of the emulsion is such that all of the liquid is absorbed by the carrier, leaving essentially no free liquid in the flask. The flask is attached to a rotary evaporator and the water is evaporated from the polymer-carrier mixture under vacuum and mild heating. When the mixture is essentially dry, it is heated to 300° C. in a furnace for 30 minutes. Then the coated carrier is mixed with 20 percent aqueous NaOH at about 60° C. for 6 hours to hydrolyze the sulfonyl fluoride groups, rinsed free of the unreacted base solution, and treated with 3N HCl to convert the polymer to the acid form. The excess HCl is removed, leaving an acid catalyst.

This acid catalyst is reacted with an aqueous solution containing an excess of Bardac+tm 2250 as described in Example 2, converting the acid groups to the quaternary ammonium salt form. The excess liquid is removed and the coated carrier is dried and heated to 175° C. for one hour. Then, the quaternary salt form of the catalyst is soaked for a period of about 24 hours in acetonitrile to which aqueous HCl has been added to bring its pH value to about 1. The acidic acetonitrile solution is decanted and replaced with fresh solution, and this soaking step is repeated three times to restore the catalyst to the acid form and to remove the quaternary ammonium cations. Finally, the acidic acetonitrile solution is removed and the catalyst is rinsed with water and dried. This improved catalyst is an expanded form of the polymer on an inert support.

EXAMPLE 4

The procedure described in Example 2 is repeated substituting dodecylbenzyltrimethylammoniumhydroxide for Bardac™ 2250. A perfluorosulfonic acid polymer having a quaternary ammonium base residue is obtained after reaction at ambient temperature.

EXAMPLE 5

Catalyst Reactivity Test Reaction

The membrane of Example 2 is acidified by soaking it several times in fresh hydrochloric acid solutions containing approximately 15 percent by weight hydrochloric acid. Thereafter, the film is rinsed with water until the rinse water becomes neutral. A sample of this polymer film is ground to a powder, dried in a vacuum oven at 150° C. to 175° C. for two hours, and then cooled in a desiccator overnight. The catalyst powder is opened momentarily to the atmosphere during weighing on a balance but is transferred to the reaction flask as quickly as practicable. Toluene and 1-decene are stored over 4 Å molecular sieves and are transferred using dry, nitrogen filled glass syringes. An analysis indicates that the toluene and 1-decene reactants contain less than 15 ppm water.

The apparatus used for the reaction is a 100 milliliter 3-necked flask having a mechanical stirrer, a condenser with a nitrogen vent attached and a thermocouple for temperature control. Heating is provided using a heating mantle. All glassware used in the reaction is dried for one hour at 140° C. and then assembled hot under a blanket of nitrogen. The reaction flask is charged with approximately 1 meq of catalyst and 25 milliliters of toluene. This mixture is stirred vigorously and heated to 100° C. Thereafter, 22 milliliters of 1-decene is added. This gives approximately a 2:1 mol ratio of toluene to 1-decene. The reaction is run at about 100° C. for thirty minutes and, thereafter, an ice bath is applied to the flask. The reaction mixture is analyzed by gas chromatography and the conversion of 1-decene is calculated by determining the amount of unreacted 1-decene. The calculated result from this catalyst reactivity test reaction is shown in Table I in comparison with a control reaction run as Comparative Example 1, as further described below.

In preparing the calculations set forth in Table I, the amount of unreacted 1-decene in each reaction mixture is determined by multiplying the normalized percent area of the decene peak from the gas chromatography report by the sum of the amounts of toluene and 1-decene added to the flask. From this, the conversion of decene is determined by subtracting the amount of unreacted decene from the amount of 1-decene originally added.

COMPARATIVE EXAMPLE 1

(not an example of the invention)

A perfluorosulfonic acid polymer having an equivalent weight of 804 g/eq (acid capacity of 1.25 meq/g) is ground to a powder and dried in a vacuum oven at 150° C. to 175° C. for two hours and, thereafter, cooled in a desiccator overnight prior to use as a catalyst. The resulting article is evaluated as an acid catalyst in accordance with the procedure described in Example 5, the results of which are shown in Table 1.

TABLE I

Catalytic Activity of Novel Ion-exchange Polymer

| Example | Catalyst meq | Toluene Weight | 1-Decene Weight | Unreacted 1-Decene weight | Conversion Percentage |
|---|---|---|---|---|---|
| 5 | 1.61 | 21.27 | 16.31 | 7.64 | 53.1 |
| C.E. 1 | 1.63 | 21.67 | 16.11 | 15.60 | 3.2 |

The difference in activities of the two catalysts of Example 5 and Comparative Example 1 indicates the greater accessibility of the sulfonic acid groups in the polymer of the invention which is used as the catalyst of Example 5 in comparison with the catalyst of Comparative Example 1. Accordingly, these results demonstrate that the polymer used as a catalyst in Example 5 provides a significant change in morphology over the polymer used as a catalyst in Comparative Example 1.

COMPARATIVE EXAMPLE 2

(not an example of the invention)

Example 2 is repeated substituting tridodecylamine for the quaternary ammonium base. Upon preparation of a polymer film membrane and the removal of all or substantially all of the tridodecylamine from the perfluorosulfonic acid polymer membrane, the water absorption of the membrane of Example 2 was compared with the water absorption of the membrane of this example. Results are shown in Table II.

COMPARATIVE EXAMPLE 3

(not an example of the invention)

A perfluorosulfonic acid polymer having an equivalent weight of 804 is evaluated for water absorption. The results are shown in Table II.

TABLE II

| | Percent Water Absorption of Membranes | | |
|---|---|---|---|
| Example | Ambient Temperature Soaking — 8 Hours | Boiled — 1 Hour | Ambient Temperature Drying — 24 Hours |
| 2 | 44 | 124 | 67 |
| C.E. 2 | 38 | 66 | — |
| C.E. 3 | 37 | 51 | 3.5 |

EXAMPLE 6

The membrane of the invention prepared in Example 2 is converted to the proton form and, thereafter, boiled in deionized water for 1 hour and then is stored under water at room temperature until evaluated for resistivity using the Four Point technique disclosed by Cahan et al. in *J. Electrochem. Soc.*, Vol. 140, p. 1185 (1993). The membrane resistivity was measured laterally in plane at ambient temperature and 100 percent relative humidity using the four electrical probes used in connection with an impedance apparatus consisting of a frequency response analyzer (Solartron™ 1170) and an electrochemical interface (Solartron™ 1186). All measurements were taken at 0 volts bias. The impedance is constant with a 0 phase angle from at least 1 to 10,000 Hz.

The resistivity test is conducted utilizing an ion-exchange polymer membrane strip measuring approximately 1 centimeter×6 centimeters which is placed in an enclosure having an inlet for nitrogen at a controlled humidity. The enclosure is made by cutting a 12 inch×12 inch center section from a 14 inch×14 inch slab of 2 inch thick foamed polypropylene. Dry nitrogen gas is directed through a gas wash bottle containing water. An electrical heating tape is wrapped around the gas wash bottle to prevent evaporative cooling of the water so as to assure a test condition in the enclosure of 100 percent relative humidity. A humidity probe (Fisher Scientific Catalogue No. 11-661-7A) is placed in the enclosure and the humidity is allowed to stabilize. Once the humidity is stabilized, it is held constant for at least one hour before the impedance measurement is made. The membrane thickness used for calculating the resistivity results shown in Table III is measured as soon as the sample is removed from the room temperature water in which it is stored. The length and width of the membrane between the inner voltage measuring probes is measured with a ruler. The test results are shown in Table III.

COMPARATIVE EXAMPLE 4

(not an example of the invention)

A perfluorosulfonic acid polymer having an equivalent weight of 804 is evaluated for resistivity when formed into a membrane in accordance with the procedure of Example 2. Results are shown in Table III.

TABLE III

| | Membrane Resistivity |
|---|---|
| Example | Resistivity (Ohm-cm) at ambient temperature and 100 percent relative humidity |
| 6 | 27 |
| C.E. 4 | 10 |

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

What is claimed is:

1. A cation-exchange fluoropolymer, prepared by a process comprising: (a) providing a cation-exchange fluoropolymer having an equivalent weight in the range of from 250 to 1000 and having counter-ions which are organic quaternary ammonium cations, and (b) exchanging at least 50 percent of such counter-ions with hydrogen ions or metal ions.

2. The fluoropolymer of claim 1 wherein the cation of the ion-exchange polymer used in step (a) of the process is derived from a quaternary ammonium compound having a molecular weight of at least about 300.

3. The fluoropolymer of claim 2 wherein said quaternary ammonium compound is selected from the group consisting of quaternary ammonium compounds of the formula:

$NR_1R_2R_3R_4^+ X^-$ wherein $R_1$, $R_2$, $R_3$ and $R_4$ are independently alkyl, aryl, aralkyl or cycloalkyl and X is F, Cl, Br, I, OH, $NO_3$, a COOH radical or an inorganic radical and said quaternary ammonium compound has a molecular weight of about 350 to about 500.

4. The polymer of claim 3 wherein the cation-exchange polymer is a perfluorinated polymer and the quaternary ammonium compound is a quaternary alkyl ammonium base or salt thereof.

5. The fluoropolymer of claim 1 wherein the cation exchange polymer used in step (a) of the process contains pendant groups of the formula:

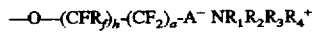

$-O-(CFR_f)_b-(CF_2)_a-A^-\ NR_1R_2R_3R_4^+$ wherein a and b are independently a number from 0–2 and $a+b \geq 1$; A is $-COO$ or $-SO_3$; $R_f$ is F, Cl, a perfluoroalkyl group having 1 to 10 carbon atoms, or a fluorochloroalkyl group having 1 to 10 carbon atoms; $R_1$, $R_2$, $R_3$ and $R_4$ are independently $C_{1-30}$ alkyl, aryl, aralkyl or cycloalkyl; and the cation has a molecular weight of at least 300.

6. The fluoropolymer of claim 5 wherein A is $-SO_3$.

7. The fluoropolymer of claim 1 wherein the cation-exchange polymer contains pendant groups of the formula:

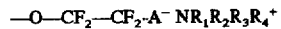

$-O-CF_2-CF_2-A^-\ NR_1R_2R_3R_4^+$ wherein A is $-COO$ or $-SO_3$; $R_1$, $R_2$, $R_3$ and $R_4$ are independently $C_{1-30}$ alkyl, aryl, aralkyl or cycloalkyl; and the cation has a molecular weight of at least 300.

8. The fluoropolymer of claim 7 wherein A is —$SO_3$.

9. The fluoropolymer of claim 7 wherein at least one R group is dodecylbenzyl.

10. The fluoropolymer of claim 5 which has a water absorption of at least 125 percent, based on the dry weight of the fluoropolymer.

11. The fluoropolymer of claim 7 wherein the polymer used in step (a) has cationic groups derived from dodecyl-benzyltrimethylammonium hydroxide or dimethyldidecylammonium chloride.

12. The fluoropolymer of claim 1 wherein substantially all of the organic quaternary ammonium cations are replaced with hydrogen ions in step (b).

* * * * *